Jan. 1, 1935.  G. R. BOTT  1,986,621

SEAL FOR ANTIFRICTION BEARINGS

Filed Sept. 14, 1933

INVENTOR
George R. Bott
BY
his ATTORNEY

Patented Jan. 1, 1935

1,986,621

UNITED STATES PATENT OFFICE 1,986,621

SEAL FOR ANTIFRICTION BEARINGS

George R. Bott, Stamford, Conn., assignor to Norma-Hoffmann Bearings Corporation, Stamford, Conn., a corporation of New York Application September 14, 1933, Serial No. 689,347

4 Claims. (Cl. 286—5)

This invention relates to anti-friction bearings, the invention being more particularly related to improved sealing means for retaining lubricant and excluding dust and grit.

The device of my invention embodies a labyrinth type seal separable from the rest of the bearing, and adapted, when in place, to retain grease lubricant and exclude dust irrespective of the position of the bearing, whether disposed horizontally, vertically or in any inclined position with respect thereto.

The labyrinth seal of the present invention has been designed and produced with a special view of efficiently sealing the grease chambers of relatively small bearings such as are commonly employed for mounting the armature shaft in vacuum cleaners and other electrically operated household appliances, but the invention is not of course limited to this kind or class of bearings since it may be usefully and advantageously employed in any kind or class of anti-friction bearing in which it is desirable to maintain the anti-friction elements properly lubricated and to seal the grease against escape or leakage irrespective of the conditions of use and of high rotative speeds.

My present invention involves a labyrinth seal in combination with mill action means and comprises inner and outer sheet metal sealing rings or plates coacting and cooperating to firmly retain a grease sealing barrier in such peculiar arrangement that the grease under the action of centrifugal force will be directed into proper lubricating channels and waste of the grease through leakage to the outside of the bearing structure prevented.

The invention also involves the above features of improvement characterized in that the sheet metal members are so attached to the bearing structure as to preclude any looseness developing and consequently any escape of grease, and further to so shape and combine the metal members that there will be no projecting parts to be damaged in handling, mounting or in use.

Another object of the invention is to provide a seal of the character described, so constructed and arranged that a relatively large grease chamber may be had, capable of holding a copious quantity of grease to assure proper lubrication, and a further object is to provide a seal construction in which an effective mill action under centrifugal influence will be obtained between relatively wide surfaces of the grease barrier and revolving seal section so that any lubricant moving or tending to move toward the labyrinth seal will be automatically sent back into the grease chamber.

Still another object of the invention is to provide a construction in which the labyrinth seal is located adjacent the inner race ring and in which the grease barrier is disposed longitudinally between the inner and outer race rings and firmly held at three sides for the mill action on the inner face thereof. With this special arrangement, I not only prevent escape of the grease lubricant to the outside of the bearing structure, but also avoid entrance of dirt and grease to contaminate the lubricant.

With these and other objects in view, the invention comprises the combination of members and arrangement of parts so combined as to coact and cooperate with each other in the performance of the functions and the accomplishment of the results herein contemplated, and in order to make the invention more clearly understood I have shown in the accompanying drawing means for carrying the same into practical effect without limiting my improvements, in their useful applications, to the practical construction which, for the purpose of example, I have illustrated.

In the drawing:—

Figure 1:
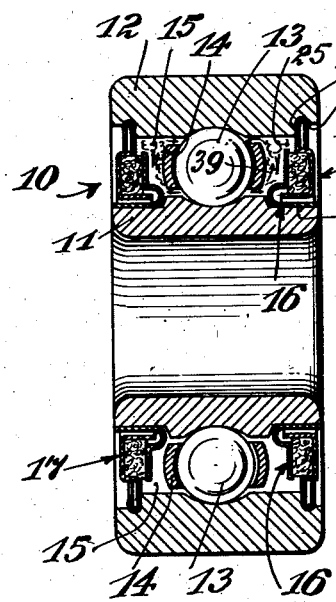
Figure 1 represents a diametrical section through an anti-friction bearing embodying the improved seals of my invention.

The illustrated anti-friction device comprises a ball bearing structure indicated generally by the reference character 10, and in this connection it may be stated that the descriptive terms employed herein, such as "anti-friction devices", "anti-friction bearings" and "anti-friction structures", are used as generic terms which include not only the illustrated ball bearings, but also roller bearings and similar devices.

Referring now in detail to the accompanying drawing, the ball bearing structure is illustrated as comprising inner and outer race members or rings 11 and 12, between which are disposed in the usual way suitable anti-friction elements, those herein disclosed comprising ball elements 13 operatively arranged in a suitable cage or retainer 14. These race members may be, and preferably are, symmetrically proportioned and are of such dimension cross sectionally as to provide a maximum of contact on the shaft and housing, whereby to make unnecessary the expedient of steel inserts in aluminum or die cast metal housings and likewise to prevent slippage, peening or cocking of the rings when suitably mounted. These members form an annular grease lubricant chamber 15 which is normally open at its opposite sides.

At each of the sides of the chamber 15, I provide sealing means to prevent the escape of the lubricant from the chamber to the outside of the bearing structure and also to prevent the entrance of dirt and grit to contaminate the lubricant within the chamber. Inasmuch as the sealing means for the two sides of the chamber are alike in construction, arrangement and in function, a detailed description of the sealing means for one side will suffice for both of the sides. My improved sealing means comprises in general two annular sheet metal seal plates or rings 16 and 17 between which is disposed a sealing barrier element 18. Said seal plates 16 and 17 may be referred to respectively as inner and outer parts. Said seal plate 16 comprises a hub portion 19, an inwardly offset annular portion 20 fashioned to produce an annular channel 21 facing outwardly, and an annular side 22 disposed radially with respect to the hub portion 19. The hub portion 19 is more or less resilient and is of such diametrical dimension with respect to the peripheral seating face 23 of the race member 11 that when the seal plate 16 is applied in place, said hub portion 19 will exert a tight frictional hugging pressure upon and around the seating face 23. These parts are so made and proportioned that the frictional hugging pressure exerted by the hub portion 19 upon the inner race member 11 will be sufficient to cause the seal plate 16 to rotate in accompaniment with the rotation of said inner race ring. The radial side 22 of this seal plate is designed to serve as a seating face for the barrier element 18 in order to carry out the functions presently to be described, and it will be observed in this connection that the outer edge 24 of the radial side 22 terminates a spaced distance from the outer race member 12 so as to leave an open space 25 in open communication with the grease lubricant chamber 15.

Figure 5:
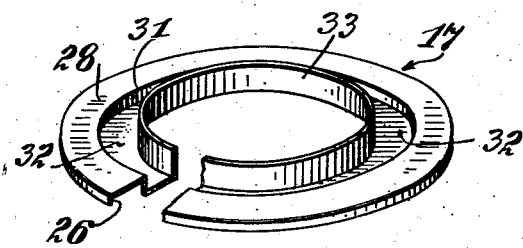
Fig. 5 is a perspective view of the outer sheet metal ring, partly broken away.
Figure 6:
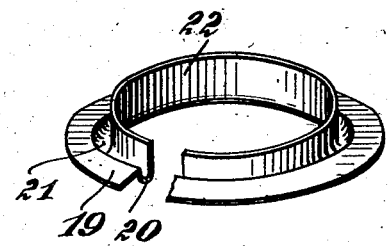
Fig. 6 is a similar view of the inner sheet metal ring, partly broken away.

The outer seal plate 17 is formed at its outer edge with a cupped flange 26 adapted to be expanded under pressure tightly into an annular recess 27 provided for the purpose in the outer ring member 12. Adjoining the expanded and formed holding flange 26 the seal plate is made with a radial side 28, there being provided on the outer ring member an annular shoulder 29 against which the radial side 28 abuts for its proper retention at one side. At the opposite side of the recess 27, there is an annular shoulder 30 against which the out-turned expanded flange abuts whereby properly to confine and retain the expanded flange in the recess. Under this arrangement, the locking means has a tight bearing clamping engagement within the recess and between the shoulders 29 and 30. Fig. 5 illustrates the outer seal plate before its attachment to the outer ring of the bearing and in this figure the form of the flange 26 before its expansion in the recess 27 between the shoulders 29 and 30 is shown.

Said outer seal plate 17 is also formed so as to provide an annular pocket for holding the barrier element rigidly in place and against the seating face 23. In order to form the annular pocket, said seal plate is of cup-shape in cross section, being constructed with a shoulder or wall 31 extending outwardly substantially at right angles to the radial side 28, a radial side 32 and a shoulder or wall 33 which extends inwardly at substantially right angles to the radial side 32. In this arrangement, it will be noted, that the parts 31, 33 and 19 are concentrically arranged and also that the part 33 is in the form of a hub which extends into the channel 21 but does not contact with the inwardly offset portion 20. The parts 33, 20 and 19 cooperate together to provide, adjacent the inner race member 11, a labyrinth seal section.

Figure 2:
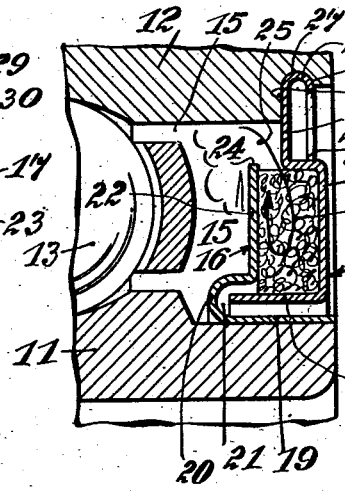
Fig. 2 represents a fragmentary sectional view on a larger scale, illustrating how the grease when properly supplied is controlled and directed to effect lubrication without escaping through the joints to the outside of the structure.
Figure 3:
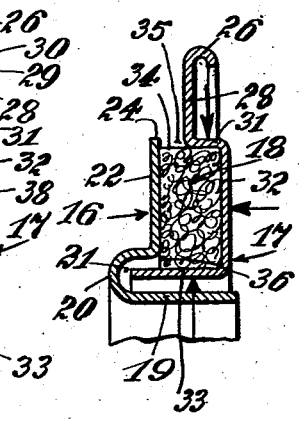
Fig. 3 is a sectional detail, illustrating in particular how the barrier element is held firmly at three sides and against the seating face of the revolving member.
Figure 4:
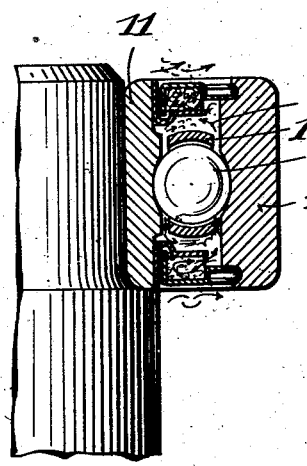
Fig. 4 is a fragmentary sectional view showing the parts as they appear when the bearing is disposed with its axis in a vertical position.

As illustrated in the drawing, the barrier element is seated in the cup-shaped section and fixedly held by the three sides 31, 32 and 33, and it is thus fixedly held in close frictional contact and engagement against the seating face or side 22 of the inner seal plate 16. By this arrangement, the seating face or radial side 22 will have an effective mill action against the contacting surface of the barrier element, and this mill action will be exerted centrifugally so that any lubricant tending to move toward the labyrinth seal section will be automatically sent back into the space 25 and thence into the grease chamber. In this connection, it will be noted that the outer peripheral portion 34 of the barrier element completely closes the opening or gap 35 between the edge 24 of the radial side 22 and the inner face of the outer seal plate 17. It will also be noted that the barrier side portion 36 completely closes the inner end of the labyrinth channel 21. As we have seen, due to the mill action of the radial side 22 on the adjacent surface of the barrier element, any grease lubricant tending to move toward the labyrinth section will be promptly returned through the opening or gap 35 into the space 25 and thence into the circulation for lubricating the anti-friction elements. If the barrier element is made of felt or the like, capable of taking up grease lubricant, the mill action under centrifugal force will cause such taken-up grease to be sent back into the chamber, the arrow 38 associated with the barrier element in Fig. 2, indicating the course of the action of any lubricant which may be taken up by the felt. The arrows 39, in Figs. 1 and 4, indicate the course of action of the lubricant being displaced centrifugally within the grease chamber, due to the rotation of the inner race member 11 and inner seal plate 16.

Attention is particularly directed to the fact that in my improved sealing means, the barrier element may be of elongated rectangular form in cross section, with the greater dimension extending in a radial direction with respect to the bearing so as to provide a large contact area between the radial side 22 and the adjacent surface of the barrier. This provision taken in connection with the mill action, with low and high speeds, prevents any grease lubricant, irrespective of the position of the bearing itself, from escaping to the labyrinth section. Furthermore, under my improvements, the outer seal plate 17 being firmly attached to the outer race ring 12, there is no possibility of looseness developing or of lubricant escaping past the expanded flange 26 clamped and locked in the recess 27.

It will be recognized that in this construction the parts are desirably and novelly arranged so that the seal plate 16, which revolves with the race member 11 will have a mill action against the relatively wide inner surface of the rigidly held barrier element 18 and that this mill action will be effective under centrifugal force to send any lubricant that may enter the fine crevice between the seating face and barrier element, back into the grease chamber toward the outer race member 12 and thence into re-circulation for lubricating purposes. It will also be noted that the barrier element completely closes the annular labyrinth section at 36 so as to avoid any entrace of dirt or grit to contaminate the grease lubricant. In contra-distinction to the well-known sealing devices for anti-friction bearings, the barrier element does not have a narrow axial zone of contact either with the inner or outer race members, but its wide and substantial face friction contact with the seating face of the inner seal plate is subjected to a mill action radially outwardly of the revolving race member so that the grease lubricant, even when partially liquefied under the highest speeds, does not escape to the labyrinth section.

Another embodiment of my improvements is that they provide a large grease chamber which may be initially packed with grease lubricant in an amount sufficient to assure proper and copious lubrication of the bearing elements, and at the opposite sides of the bearing structure there are no projecting seal parts to be damaged in handling, mounting or in use. The sealing means at the opposite sides of the grease chamber effectively prevent the escape of lubricant to the outside of the bearing structure irrespective of the position of the latter, whether its axis be disposed horizontally, vertically, or at any inclinations between these two positions.

While my invention has been illustrated and described with some degree of particularity, it is realized that in practice various changes and alterations may be made therein, and further that the invention is capable of embodiment in many different bearing constructions, it has been sought herein to illustrate only such an embodiment as will suffice to exhibit the character of the invention. Reservation is, therefore, made to the right and privilege of changing the form of the details of construction or otherwise altering the arrangement of the parts without departing from the spirit or scope of the invention or the scope of the appended claims.

I claim:

1. In an anti-friction bearing, including inner and outer raceways forming a chamber and separated by roller elements within the chamber, a seal member having an annular hub portion attached to the inner race ring, and an annular flat portion in a plane at right angles to the axis of rotation of the bearing, and an annular channel portion, open outwardly and disposed between the hub portion and the flat portion, said flat portion extending into the chamber from the channel portion and having a free end, a second seal member attached to the outer race ring, and having a side extending towards the inner race ring and having a flat portion in proximity thereto substantially parallel with the axis of rotation of the bearing, and having a free end extending within the annular channel portion of the first seal member, and a barrier element closing the space between the opposed portions of the first and second seal members, and having its radially inward side covered by the portion of the second seal member, parallel with the axis of rotation, and having a radially outward part uncovered by the seal member and in free communication with the space disposed between the barrier and the outer race ring, and a portion of its lateral side facing the channel portion uncovered by the seal member, whereby the labyrinth formed by the channel portion of the first seal member and the free end of the second seal member, prevents outside dust from entering the barrier, and the lubricant in the barrier is thrown centrifugally outwards from the uncovered portion of the barrier into the space between the barrier and the outer race ring.

2. In an anti-friction bearing including inner and outer race members and anti-friction members therebetween, said outer race member having an annular groove inwardly of an end thereof, an annulus, a peripheral portion carried by the annulus and seating in said groove, a cup-shaped annulus carried by said first annulus having the open side facing inwardly of the race members the outer wall of said cup-shaped annulus being of less width than the inner wall, a lubricant retaining member in the cup-shaped annulus and having a width greater than the width of the outer wall of the cup-shaped annulus to expose a portion of the periphery of said lubricant retaining member inwardly of said first annulus, and an annular member carried by the inner race member engaging against the inner face of the lubricant retaining member.

3. In an anti-friction bearing including inner and outer race members and anti-friction members therebetween, said outer race member having an annular groove inwardly of an end thereof, an annulus, a peripheral flange carried by the annulus and seating in said groove, a ring shaped oil retaining member, an inwardly facing cup-shaped member carried by said annulus for supporting said retaining member with a part of the periphery thereof spaced inwardly from the inside wall of the outer race member and with a portion of the periphery of the retaining member exposed within the space between the race members and inwardly of said annulus, and means carried by the inner race members engaging against the inner face of said retaining member to prevent dust passing between the inner race member and the retaining member.

4. In an anti-friction bearing including inner and outer race members and anti-friction members therebetween, one of said members having a groove confronting the other member and disposed inwardly of an end of said one member, an annulus having the periphery thereof seated in said groove, an oil retaining ring between the race members, a cup-shaped supporting means carried by said annulus engaging three faces of said ring for supporting said ring from said one member, said supporting means facing inwardly and leaving a portion of the periphery of the ring exposed within the space between the race members, one wall of said supporting means being wider than the opposite wall, and means carried by the other of the race members engaging the inner surface of the ring and having a curved portion encompassing a portion of said one wall to thereby form a labyrinth and prevent dust passing between the ring and said other race member.

GEORGE R. BOTT.